(12) United States Patent
East et al.

(10) Patent No.: US 7,947,785 B2
(45) Date of Patent: May 24, 2011

(54) POLYOXAZOLIDONES DERIVED FROM BISANHYDROHEXITOLS

(75) Inventors: Anthony J. East, Madison, NJ (US);
Michael Jaffe, Maplewood, NJ (US);
Willis B. Hammond, Chatham, NJ (US);
George Collins, Maplewood, NJ (US);
Ronald N. DeMartino, Wayne, NJ (US);
Zohar Ophir, West Orange, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 258 days.

(21) Appl. No.: 12/470,248

(22) Filed: May 21, 2009

(65) Prior Publication Data

US 2010/0298520 A1    Nov. 25, 2010

(51) Int. Cl.
*C08G 59/40* (2006.01)
*C08L 63/00* (2006.01)
(52) U.S. Cl. ............... 525/528; 528/53; 528/55; 528/73
(58) Field of Classification Search ............... None
See application file for complete search history.

(56) References Cited

U.S. PATENT DOCUMENTS

| 3,041,300 | A |   | 6/1962  | Morrison |         |
|-----------|---|---|---------|----------|---------|
| 3,272,845 | A |   | 9/1966  | Zech et al. |      |
| 4,066,628 | A |   | 1/1978  | Ashida et al. |    |
| 5,112,932 | A |   | 5/1992  | Koenig et al. |    |
| 5,837,353 | A | * | 11/1998 | Barsotti et al. | 428/204 |
| 6,656,577 | B1 |  | 12/2003 | Adelman et al. |   |
| 7,049,390 | B2 |  | 5/2006  | Adelman et al. |   |
| 7,619,056 | B2 | * | 11/2009 | East et al. | 528/421 |
| 2008/0009599 | A1 | | 1/2008  | East et al. |       |

FOREIGN PATENT DOCUMENTS

JP    5-320303 A  *  12/1993

* cited by examiner

*Primary Examiner* — Robert Sellers
(74) *Attorney, Agent, or Firm* — Kent A. Herink; Emily E. Harris

(57) ABSTRACT

Disclosed is a method for preparing polyoxazolidones wherein an ether of a bisanhydrohexitol is reacted with a diisocyanate under conditions which form polyoxazolidones. Preferred bisanhydrohexitols include isoidide, isomannide and isosorbide. The polyoxazolidones are highly crosslinked, rigid, and have high solvent resistance.

5 Claims, No Drawings

POLYOXAZOLIDONES DERIVED FROM BISANHYDROHEXITOLS

This Invention was made with U.S. Government support under Grant Agreement 68-3A75-6-507 awarded by the United States Department of Agriculture. The Government has certain rights in this invention.

BACKGROUND OF THE INVENTION

The invention relates generally to the synthesis of organic compounds and, more specifically, to the synthesis of polyoxazolidones from bisanhydrohexitols.

Much effort is being currently directed into finding routes to new and useful materials, derived from biomass precursors. One valuable source is a class of sugar derivatives called bisanhydrohexitols. Such materials are usually water-loving and harmless and find widespread use in such areas as pharmaceuticals and food chemistry. They are derived from hexose sugars by reduction to the appropriate hexitols, which are then cyclo-dehydrated in the presence of mineral acids such as sulfuric acid. The most widely available bisanhydrohexitol is isosorbide, which can be obtained from sorbitol, in turn made from glucose which comes from biomass by fermentation reactions. Others are isomannide (from mannose) and isoidide (from idose). These three specific bisanhydrohexitols (also called isohexides) are particularly useful because they have a cis-bridged bicyclic structure containing two fused tetrahydrofuran rings. This stereochemistry lends itself well to the synthesis of useful structural polymers. Isosorbide is increasingly becoming used as an intermediate and raw material for polymers, additives and stabilizers.

It is known to use isosorbide as a diol co-monomer in polyesters such as polyethylene terephthalate (Adelman et alia, U.S. Pat. No. 6,656,577) and in polytrimethylene terephthalate (Adelman et alia, U.S. Pat. No. 7,049,390). The stiffness and rigidity of the isosorbide ring structure serves to raise the glass-rubber transition temperature (Tg) of these polyesters. Because isosorbide is a stiff functional material, other polymers such as polyurethanes and epoxy resins have been explored. One desirable reason for using isosorbide and its analogues is that they are harmless materials which are already used in medicinal polymers and certain pharmaceuticals and meet the FDA criteria for substances that are Generally Recognized as Safe (GRAS). An added advantage is that they may be used to replace materials such as bisphenol-A, which not only an intermediate derived from petroleum sources but one which is known to be a xenestrogen and is under increasing suspicion of being an endocrine disrupter. Traces of bisphenol-A are widely distributed throughout the environment and may enter the food chain, since epoxy resins containing bisphenol-A are frequently used in can coatings. Condensation of isosorbide or other isohexides with epichlorhydrin to make diglycidyl ethers is described by Zech and Le Maistre (U.S. Pat. No. 3,272,845) and by Morrison (U.S. Pat. No. 3,041,300). Recent work by East and coworkers has described high-performance cured epoxy-resins with excellent physical properties using glycidyl ethers derived from bisanhydrohexitols and cured with acid anhydrides or cyclic polyamines. Such cured epoxy resins are described in U.S. Patent Application No. 2008/0009599 (East et alia), which is incorporated herein in its entirety by this reference.

Polyoxazolidones are polymers made by curing epoxy resins with polyisosocyanates. Typical examples of the synthesis of such polymers have been taught by Koenig et alia in U.S. Pat. No. 5,112,932, and Narahara in U.S. Pat. No. 4,070,416. The curing mechanism is generally believed to be the addition and ring-opening of the three-membered epoxy ring onto the isocyanate group to form the five-membered oxazolidone ring, a reaction catalyzed by a wide variety of catalysts, such as quaternary ammonium salts and various organometallic compounds (see U.S. Pat. No. 4,066,628) as well as tertiary amines such as N-alkyl morpholines, alkylimidazoles and diazabicyclo 2,2,2-octane, (see U.S. Pat. No. 4,070,416). Polyoxazolidones are known to form highly crosslinked and rigid cured thermoset resins having a high solvent resistance. It is believed that the crosslinking is due to a combination of oxazolidone formation and trimerization of the isocyanate groups to form trifunctional isocyanurate linkages. According to Narahara the degree of formation of isocyanurates is favored by curing below 130° C. while the formation of oxazolidones is favored by curing above 130° C. The cured polymers have been found particularly useful for thermoset resins used as printed circuit board laminates, compression molded parts, insulated lacquers for coils and electric circuitry, where their solvent resistance and stiffness is used to great effect.

The electrical and electronic industries world wide have in recent years begun a wide-ranging campaign to improve their environmental record as exemplified by the abolition, at considerable expense, of lead based solders and their replacement with tin-silver solder alloys. By the same token, the replacement of thermoset polymers based upon materials such as bisanhydrohexitols rather then the environmentally unsound bisphenol-A based materials is a step in line with this philosophy.

SUMMARY OF THE INVENTION

We have found that reacting glycidyl ethers of bisanhydrohexitols with polyisocyanates, using the appropriate stoichiometry, gives stiff, high Tg thermoset resins with good thermal stability and low moisture uptake.

DESCRIPTION OF THE INVENTION

In general, the present invention relates to the process of reacting glycidyl ethers of bisanhydrohexitols with polyisocyanates to form polymers of oxazolidones. Suitable bisanhydrohexitols include isosorbide, isoidide and isomannide. A wide variety of polyisocyanates can be used. Typical ones are diphenylmethane-4,4'-diisocyanate (MDI), dicyclohexylmethane diisocyanate (HHMDI), isophorone diisocyanate (IPDI), various isomers of toluene diisocyanate (TDI), hexamethylene diisocyanate (HDI), triphenylmethane triisocyanate, biphenyl-3,3',4,4'-tetraisocyanate and polymeric isocyanates derived from aniline-formaldehyde resins which have been subsequently phosgenated. For uses where the final cured resin will be exposed to sunlight or other sources of UV radiation, one might prefer to use only those diisocyanates that contain aliphatic or alicyclic groups, such as HHMDI, since aromatic diisocyanates give products that tend to discolor to a yellow or brown color due to photochemical reactions. An example is given which may be taken as typical of the invention but which by no means implies limitations on its scope.

The glycidyl ethers used as starting materials may either be totally uncured or may have been partially cured with any well-known epoxy curing agents not inimical to the subsequent curing with polyisocyanates. Fillers, such as bonding agents, silicon carbides, diamond chips, diatomaceous earth, carbon fibers and fibrils, wollastonite, talc and other minerals, suitable for use in thermoset polyurethanes or thermoset polyesters may also be used.

EXAMPLE 1

Preparation an Isosorbide Epoxy Resin

A 5-liter 5-neck flask was fitted with a sealed paddle stirrer, an inverted pattern Dean and Stark water-separator tube (for solvents heavier than water), reflux condenser, long stem thermometer dipping well into the reaction flask, a 500 ml pressure-equalizing tap funnel fitted with a Kontes "Varibor"™ stopcock, and an inlet and outlet for inert gas (nitrogen or argon) to blanket the reaction. All ground glass joints were protected with PTFE sleeves to prevent the glassware from seizing up under the influence of strong aqueous alkali. The flask was charged with 584 gm (4.00 moles) "Cerestar" brand isosorbide, and 3700 gm (40.0 moles) of 98% epichlorhydrin. The mixture was sparged with nitrogen gas and stirred and brought to a gentle reflux under a slow stream (2 bubbles per second) of nitrogen gas. The reaction flask temperature was 115° C. and the still head 112° C. The stirrer was set to 260 rpm.

Meanwhile a solution of 320 gm (8.0 moles) sodium hydroxide was dissolved in 320 mls distilled water and, after cooling, the caustic alkali solution was added to the P.E. tap funnel. When the reaction was steadily refluxing, the Varibor stopcock was adjusted to allow a slow stream of alkali (about 2-3 drops/minute) to be added to the reaction flask. This was to avoid any sudden exothermic reaction. It was found very desirable that the alkaline solution be dropped directly into the liquid mixture and not allowed to run down the insides of the reaction flask, as this eventually would lead to a large aggregates of crystalline sodium chloride encrusted on the walls of the reactor. Gradually, water began to appear as an upper layer in the D-S tube and the reaction was left to proceed steadily.

Periodically, water was run off from the Dean-Stark tube which was fitted with a 3-way stopcock for this purpose. The reaction mixture was initially clear and pale yellow but soon went cloudy with precipitated salt and gradually became a thick slurry of liquid and precipitated solid. The rate of addition of base was speeded up somewhat after three hours and the whole addition step took about 12 hours.

By this time 458.5 mls water (98.5% theory, allowing for the added water) were collected. The reaction was run for another 45 minutes to ensure no more water was forming as a layer above the organic phase in the D-S tube. The reaction was left to cool and stand overnight under a slow nitrogen stream. Next day the mixture was filtered through large sintered glass funnel to remove the sodium chloride and the filtrate collected. The solid on the funnel was washed several times with acetone but the acetone washings were kept separate at this time from the first filtrate. Both filtrates were taken down separately on a rotary evaporator and the excess epichlorhydrin was recovered for redistillation and re-use from the first filtrate. The first batch yielded 917 gms of resin (88.9% theory) and the second (acetone) batch left 76 gms. The combined yield was 992 gm, 96% theory, as a viscous pale yellow resin. Approximately 900 gm of epichlorhydrin was recovered by redistillation.

The recovered and dried sodium chloride weighed 460 g, 98% theory. The epoxy equivalent of the resin, as measured by reaction with an aliquot of standard pyridine hydrochloride in excess pyridine under nitrogen at 100° C. and subsequent back titration with standard methanolic potassium hydroxide using phenolphthalein as indicator was 223. This corresponds to an average resin molecular weight of 446 Daltons and indicates a dimeric structure with two isosorbide units joined with a 2-hydroxy-1,3-propane di-ether link and capped with glycidyl ether units.

EXAMPLE 2

Formation of a Polyoxazolidone from the Epoxy Resin

A mixture of 9.2 gms of the isosorbide epoxy resin and 7.86 gm dicyclohexylmethane-4,4'-diisocyanate was thoroughly blended in a 100 ml beaker on a hotplate under a slow current of nitrogen gas. The resin had a calculated MW of 460 and a titratable epoxy equivalent of 230 gm/equivalent. The epoxy has an overall stoichiometry corresponding to two epoxy groups and one —OH group per molecule; consequently it was mixed with the diisocyanate in the molar ratio 2:3, so that all the epoxy groups and the additional hydroxyls could react with an isocyanate function. The two viscous liquids were not wholly miscible at room temperature but on warming became homogeneous. A small amount (0.1 gm) of benzyltrimethylammonium chloride was added as a catalyst. This was immiscible until the batch reached 95° C., when it melted and blended into the mixture. As soon as the mixture reached 105° C. there was a pronounced exothermic reaction and the batch rose quickly to 130-35° C. and grew extremely viscous and rubbery. The mixture was heated in an air oven at 110° C. for thirty minutes. At the oven temperature the mixture was still rubbery but on cooling to room temperature formed a clear pale amber glassy solid, which was isolated by smashing the glass beaker and removing the solid lump of polymer. The curing behavior of the polymer was investigated by DSC. Initially the pre-polymer had a Tg of 40° C. Heating to 160° C. raised the Tg to 48° C., holding for 60 minutes at 200° C. gave a Tg of 104° C., while a further 30 minutes at 250° C. gave a Tg of 130° C. The prepolymer as isolated was brittle and easily ground up, but after prolonged curing at 250° C. it became hard and tough and no longer brittle. After total immersion in water for 24 hours, a sample chip was removed and all surface moisture dried off. After re-weighing the moisture regain was calculated as approximately 4% w/w.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A method for preparing polyoxazolidones, comprising the step of combining a polyfunctional glycidyl ether of a bisanhydrohexitol with a polyisocyanate under conditions which form a crosslinked structure containing a significant proportion of polyoxazolidone rings.

2. The method of claim 1, further comprising a catalyst.

3. The method of claim 2, wherein the catalyst is selected from the group consisting of quaternary ammonium salts, tertiary amines, N-alkylmorpholines, imidazoles, diethyl zinc, and organo-antimony compounds.

4. The method of claim 1, wherein the bisanhydrohexitol is selected from the group consisting of isoidide, isomannide and isosorbide.

5. Thermoset polymers containing a significant proportion of oxazolidone rings made under the method of claim 1.

* * * * *